United States Patent
Samworth

(10) Patent No.: US 10,359,533 B2
(45) Date of Patent: Jul. 23, 2019

(54) METHOD OF ESTABLISHING FORMATION RESISTIVITY

(75) Inventor: James Roger Samworth, Leicestershire (GB)

(73) Assignee: REEVES WIRELINE TECHNOLOGIES LIMITED, Leicestershire (GB)

(*) Notice: Subject to any disclaimer, the term of this patent is extended or adjusted under 35 U.S.C. 154(b) by 1379 days.

(21) Appl. No.: 13/548,725

(22) Filed: Jul. 13, 2012

(65) Prior Publication Data

US 2013/0024121 A1 Jan. 24, 2013

(30) Foreign Application Priority Data

Jul. 19, 2011 (GB) .................................. 1112413.8

(51) Int. Cl.
*G01V 3/20* (2006.01)

(52) U.S. Cl.
CPC ...................................... *G01V 3/20* (2013.01)

(58) Field of Classification Search
CPC .......... E21B 44/00; E21B 47/00; E21B 47/12; E21B 49/08; E21B 21/08; E21B 47/06; G01V 3/28; G01V 3/18; G01V 3/30
See application file for complete search history.

(56) References Cited

U.S. PATENT DOCUMENTS

| | | | | |
|---|---|---|---|---|
| 3,660,755 A * | 5/1972 | Janssen | ..................... | G01V 3/24 324/375 |
| 6,211,678 B1 * | 4/2001 | Hagiwara | ..................... | 324/338 |
| 2014/0032116 A1 * | 1/2014 | Guner | ..................... | G01V 3/30 702/6 |

FOREIGN PATENT DOCUMENTS

| | | |
|---|---|---|
| EP | 0816871 A2 | 6/1997 |
| GB | 2121189 A | 5/1982 |
| GB | 2287324 A | 9/1995 |
| GB | 2355802 A | 5/2001 |
| GB | 2458504 A | 9/2009 |
| GB | 2458505 A | 9/2009 |
| GB | 2464270 A | 4/2010 |

OTHER PUBLICATIONS

Search Report in counterpart UK Appl. GB1112413.8, dated Nov. 1, 2011.
Samworth, J.R. et al., "The Array Induction Tool Advances Slim Hole Logging Technology," SPWLA European Formation Evaluation Symposium, Aberdeen, Oct. 11-13, 1994.

* cited by examiner

*Primary Examiner* — Alexander Satanovsky
*Assistant Examiner* — Mark I Crohn
(74) *Attorney, Agent, or Firm* — Blank Rome LLP

(57) ABSTRACT

In a method of processing resistivity log data, two or more resistivity log measurements of differing depths of penetration of an invaded formation are generated. The deepest and shallowest of the resistivity log measurements are combined in accordance with a non-linear combination algorithm that is modulated by a parameter. The value of the parameter used varies in dependence on a comparison between deep and shallow log measurements. The results of the comparison are forward modelled from sample data. A modified log output is generated as a result of combining the deepest and shallowest of the resistivity log measurements in accordance with the non-linear combination algorithm.

14 Claims, 3 Drawing Sheets

METHOD OF ESTABLISHING FORMATION RESISTIVITY

CROSS-REFERENCE TO RELATED APPLICATIONS

This application claims the benefit under 35 U.S.C. § 119(a) of U.K. Appl. No. GB 1112413.8, filed 19 Jul. 2011.

FIELD OF THE DISCLOSURE

The invention concerns a method of establishing the resistivity of geological formations, and in particular the resistivity of a formation that is penetrated by a borehole for the purpose of extracting a commodity of commercial value.

BACKGROUND OF THE DISCLOSURE

A formation is penetrated by a borehole for the purpose of extracting a commodity of commercial value. Examples of such commodities include but are not limited to oils, flammable gases, tar/tar sands, various minerals, coal and water.

When considering the extraction of such materials the logging of geological formations is, as is well known, economically an extremely important activity.

Virtually all commodities used by mankind are either farmed on the one hand or are mined or otherwise extracted from the ground on the other, with the extraction of materials from the ground providing by far the greater proportion of the goods used by humans.

It is extremely important for an entity wishing to extract materials from beneath the ground to have as good an understanding as possible of the conditions prevailing in a region from which extraction is to take place.

This is desirable partly so that an assessment can be made of the quantity and quality, and hence the value, of the materials in question; and also because it is important to know whether the extraction of such materials is likely to be problematic.

The acquisition of such data typically makes use of techniques of well logging. Well logging techniques are employed throughout the mining industry, and also in particular in the oil and gas industries. The invention is of benefit in logging activities potentially in all kinds of mining and especially in the logging of reserves of oil and gas.

In the logging of oil and gas fields (or indeed geological formations containing other fluids) specific problems can arise. Broadly stated this is because it is necessary to consider a geological formation that typically is porous and that may contain a hydrocarbon-containing fluid such as oil or natural gas or (commonly) a mixture of fluids only one component of which is of commercial value.

This leads to various complications associated with determining physical and chemical attributes of the oil or gas field in question. In consequence a wide variety of well logging methods has been developed over the years. The logging techniques exploit physical and chemical properties of a formation usually through the use of a logging tool or sonde that is lowered into a borehole (that typically is, but need not be, a wellbore) formed in the formation by drilling.

In most cases, the tool sends energy into the formation and detects the energy returned to it that has been altered in some way by the formation. The nature of any such alteration can be processed into electrical signals that are then used to generate logs (i.e. graphical or tabular representations containing much data about the formation in question).

A resistivity logging tool is an elongate cylinder that operates by sending an electric current from a current-emitting electrode (sometimes called a "survey" electrode) into the formation. The current spreads into the rock of the formation and returns via an arcuate path to one or more receiver electrodes located either remotely or on the tool at locations that are longitudinally spaced from the survey electrode. Return of the current is assured by setting the potentials of the return electrodes so as to promote passage of the current initially away from the emitter electrode and then back towards the appropriate return electrode.

As the current passes through the rock, the resistance of the latter, which in turn is determined by the materials of and in the rock, attenuates the current. Measuring the current and voltage at the return electrodes together with a knowledge of the geometry of the current paths provides a measure of the resistivity of the material through which the returning current has passed.

In addition to the primary current emitter electrode, a resistivity tool typically has more than one set of secondary electrodes that are located at spaced intervals along the length of the tool. In one arrangement of the electrodes, the current only penetrates a short distance into the formation, while further arrangements cause the current to flow greater distances into the formation.

The detection of the resistivity from the short penetrating electrode arrangement therefore is said to be a "shallow" measurement or log; and the resistivity measured via a further electrode arrangement is said to be, a "deep" measurement or log. As their names imply these terms are used in reference to the extent to which the current penetrates the formation before returning to the tool.

Plural resistivity measurements of various depths of penetration can be formed by combining the deep and shallow measurements with various weightings in order to determine the true resistivity $R_t$ of the formation. From this it is possible to assess (often in conjunction with log measurements obtained using different tools) the nature of fluids captured in the formation. Inverting the value of $R_t$ provides the conductivity of the formation, another useful parameter in log generation and analysis.

Invasion, as is well known in the art, refers to a situation in which fluid (such as drilling fluid or chemicals added during or after drilling) invades the (porous) formation surrounding the borehole. In the art, the invasion is assumed to be of "step" profile, i.e. there is assumed to be an abrupt transition from invaded to non-invaded geology. Although this is not strictly an accurate way of describing invasion, for processing purposes it is usually reckoned to be sufficiently accurate. The term "invasion diameter" is used to indicate the extent of the assumedly circular region of invasion surrounding a borehole.

The resistivity of the invaded zone is different to and often less than the resistivity of the non-invaded zone that surrounds it. This means that a resistivity log performed on the formation in the invaded zone surrounding the borehole would return a value of resistivity that is unacceptably low.

Similarly the resistivity of the borehole can significantly, adversely affect the accuracy of a resistivity measurement. The influence of the borehole is known as a "borehole effect".

In some cases it is possible to process resistivity log information in ways that compensate for the influence of invasion and borehole effects. For example patent no GB 2458504 B, the entire content of which is incorporated herein by reference, describes a method in which two or more resistivity or conductivity logs are run in respect of the same length of a borehole, at differing depths of penetration. The logs are then compared in accordance with an algorithm in order to determine whether the resistivity values they contain tend towards a single asymptote. If so, the asymptote is taken to be an indication of $R_t$.

The method of GB 2458504 B represents a significant improvement in the art of resistivity logging and the determination of formation conductivity. However, it is not suitable for use in all situations.

This is partly because the need to log the same length of a borehole twice or more at differing depths of penetration may, depending on the precise type of logging tool available, call for more than one pass of logging equipment along the borehole.

Logging activity, however, can be extremely expensive, primarily because the need to log a well generally interrupts drilling and well completion activities. Since these activities can incur costs of several thousands of dollars an hour, it is generally undesirable for assets such as drilling equipment and staff such as drilling engineers to be unoccupied for any appreciable length of time.

To some extent, the cost of drilling downtime can be alleviated through the use of an array resistivity tool. In this tool type, that is known in the art, several receivers simultaneously log the same length of borehole to different depths of penetration. If problematic effects such as vertical resolution differences between the receiver electrode outputs can be overcome, such tools are often more efficient than single-measurement types.

Enhancement of the vertical resolution of array tool outputs is a major benefit of certain techniques described in GB 2458504 B; but the described method requires establishment of whether the resistivity values of the respective, differing-depth logs tend to an asymptote. Depending on the computing power available to analyse log data, this may be impossible to achieve in real time.

Moreover the techniques disclosed in GB 2458504 B require inputting of three variables, and these are not always available on a real-time measurement basis.

Real-time assessment of $R_t$, however, is strongly desirable for various reasons, including but not limited to the general desire to avoid drilling equipment downtime. It would therefore be beneficial to provide a technique that is useable to generate $R_t$ to an acceptable degree of accuracy in a manner that permits real-time calculation of the quantity.

SUMMARY OF THE DISCLOSURE

According to the invention in a broad aspect there is provided a method of processing resistivity log data comprising the steps of: a) generating two or more resistivity log measurements of differing depths of penetration of an invaded formation; b) combining the deepest and shallowest said log measurements in accordance with a non-linear combination algorithm that is modulated by a parameter the value of which varies in dependence on a comparison between deep and shallow log measurements, the results of the comparison being forward modelled from sample data; and c) generating a modified log output as a result of Step b.

This method may generate $R_t$ or a range of other parameters that are significant when logging a borehole. The mentioned modulating parameter may be forward-modeled (i.e., calculated in advance of operation of the method, and stored) so that the method may successfully run in real-time even though only two input variables are available.

The ability to calculate $R_t$ in real-time is a significant advantage of the method of the invention over the prior art.

As indicated, preferably the modified log output is an indication of the true resistivity $R_t$ of the formation. Also as indicated, the method desirably may be carried out in real time on measured log data. The method may also be performed in respect of non-real time data.

Preferably, in accordance with the method, calculation of the true resistivity $R_t$ is in accordance with the expression $R_t = 10^{\wedge}(k*\log (\text{Deep}) + (1-k)*\log (\text{Shallow}))$ in which: "Deep" represents the output of the deepest of an array of at least two measurements in a resistivity tool; "Shallow" represents the output of the shallowest of the array of measurements; and k is a parameter that is selected for the formation under investigation.

Ideally, k preferably represents a function of the ratio of resistivity $R_{xo}$ of a zone of invasion to true resistivity $R_t$ of the formation. However, this information is not available as the log is being run, so k instead can be generated as a function of the ratio of the shallowest to the deepest measurement, the range of this ratio being established by forward modelling the shallow and deep measurements from a range of assumed $R_{xo}$, $R_t$, and diameter of invasion values.

Conveniently the modified log output is an array of resistivity curves corresponding to differing depths of measurement. This aspect of the method of the invention allows the presentation of the results of the method in a manner that is familiar to users of known array resistivity logging tools.

Indeed, preferably the step of generating two or more resistivity log measurements includes the step of operating an array resistivity logging tool to generate the measurements. A particularly preferred type of logging tool is an array laterolog tool, although other types of logging tool are useable in the method of the invention.

In such a case the resistivity measurements arise effectively simultaneously, giving rise to the option of real-time processing to generate $R_t$. By "effectively simultaneously" is meant a situation in which the periods during which generation of the deep and shallow measurements take place overlap substantially. Consequently only a single pass of the logging tool along the borehole section of interest is needed. However, if desired, the method of the invention may instead include running separate passes of one or more logging tools along the length of borehole under investigation, in order to generate the two or more resistivity log measurements. In this latter case, of course, the calculation of $R_t$ (or any other parameter of the formation that it is desired to use the method to calculate) cannot be completed in real time or at any rate as indicated is not completed on the basis of a single pass of the tool along the borehole section of interest.

Preferably, the value of the parameter is the result of modelling of deep and shallow log measurements; and more particularly, calculation of the parameter includes the step of determining the value of the parameter by modelling deep and shallow log measurements other than the generated measurements.

Thus, a range of values of the parameter may be established using e.g. standardised borehole measurements obtained in a laboratory, and/or mathematically synthesised values of the parameter and/or real deep and shallow borehole resistivity data (i.e. data from logged boreholes), and stored as e.g. a database or look-up table. During operation of the method it then is possible to select a value of the parameter that most closely matches the instantaneously prevailing borehole condition, and use it in the calculation of $R_t$ in accordance with the method of the invention.

In one embodiment, therefore, the method of the invention includes the step of accessing a database of stored values of the parameter.

BRIEF DESCRIPTION OF THE DRAWINGS

There now follows a description of preferred embodiments of the invention, by way of non-limiting example, with reference being made to the accompanying drawings in which.

DETAILED DESCRIPTION

Figure 1A:
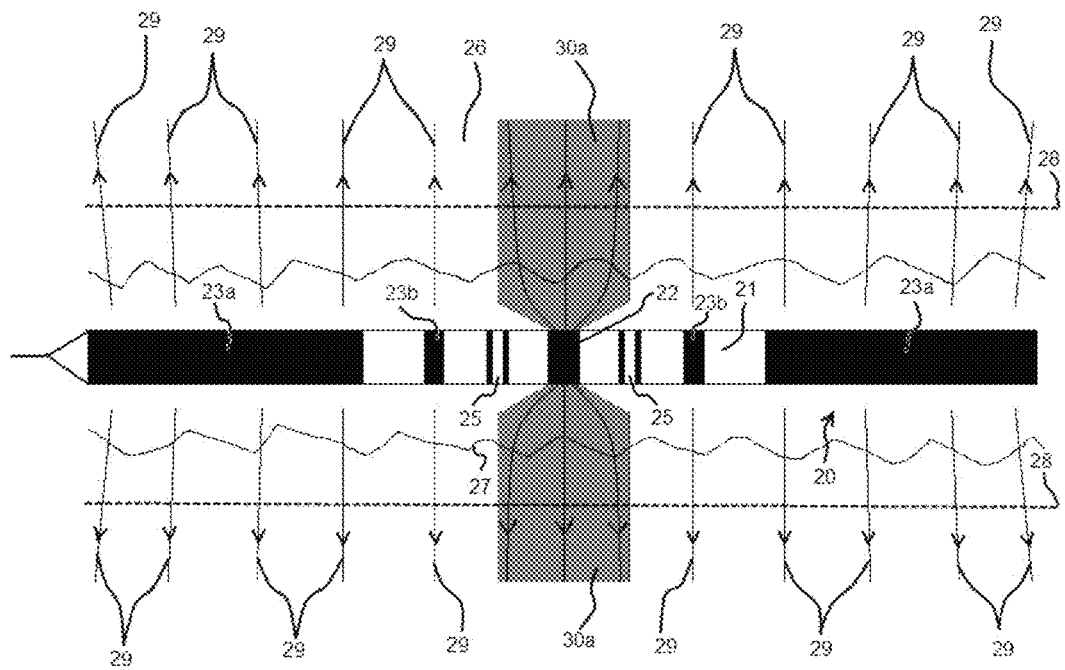
FIG. 1a is a simplified, schematic illustration of an electrode-type resistivity logging tool operating in "deep" mode.
Figure 1B:
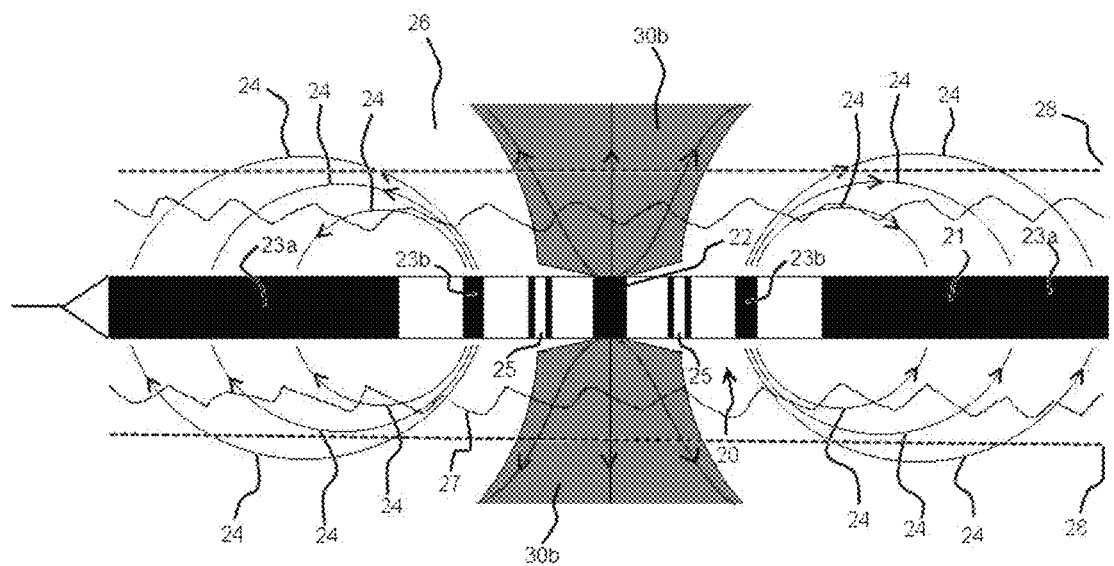
FIG. 1b is a view similar to FIG. 1a showing the tool operating in "shallow" mode.

Referring to the drawings and initially FIGS. 1a and 1b, an array resistivity logging tool 20 typically is an elongate metal cylinder 21 as shown.

FIGS. 1a and 1b show extremely simplified depictions of the main parts of a resistivity logging tool.

The figures show a typical "dual Laterolog" tool, including certain aspects of such a tool such as the arrangement of its electrodes. The precise details of the construction and connection of such features, and the ways of controlling of the tool when using prior art techniques, will be known to those of skill in the art. In view of this it is not necessary herein to describe in full the character and operation of such a tool.

The method of the invention, moreover, as stated herein, while highly suitable for implementation using a dual Laterolog logging tool is applicable to a range of other tool types and designs in addition; and the invention as claimed is not limited solely to use in tools of the kind shown in FIG. 1a and FIG. 1b.

At approximately the mid-point of its length, the tool 20 includes a current emitter electrode 22. Spaced from emitter electrode 22, a relatively short distance along the length of the cylinder 21 to either side of the emitter arrangement is a respective arrangement of voltage measurement electrodes 25. As is known in the use of the Laterolog tool, these electrodes control the shape of the emitted current represented by the field lines in the shaded area 30, and also are used for measuring voltages in the calculation of the resistivity of a formation 26 surrounding a borehole 27 in which the tool 20 lies. Further, guard electrodes 23a and 23b (the nature and purpose of which are known to the skilled worker) lie spaced along the tool cylinder 21 to either side of the voltage measurement electrodes 25.

In one mode of operation of the tool 20, shown in FIG. 1a, this arrangement permits performance of a deep measurement, and in a further mode (shown in FIG. 1b) the electrode arrangement makes a shallow measurement. The manner of connecting the electrodes in order to achieve these effects is known to the worker of skill. Therefore, it is not necessary to describe in detail the operation of the logging tool in detail in that regard.

The current emitter electrode 22 and the electrodes 23a and 23b are connected to a control circuit. When the tool 20 operates in "shallow" mode (FIG. 1b), the control circuit controls the potentials at the electrodes 22, 23a and 23b such that the emitted current in shaded area 30b follows the path shown by the field lines within the shaded section of the drawing. Field lines 24 represent arcuate, shallow current paths indicative of return to the guard electrodes 23, as is known in shallow mode array resistivity tool operation.

The control circuit alters the connections and voltages when the tool operates in "deep" mode such that the emitted current follows field lines exemplified in the shaded part 30a in FIG. 1a. The numerals 29 in FIG. 1a indicate the current passing from the guard electrodes 23a and 23b.

When the tool operates in this mode, the current flows to one or more remote receiver electrodes that are not visible in FIG. 1a. Such electrodes in some tool types are located at eg. a surface location. In other designs, the remote electrodes lie on a supporting wireline and are isolated from the tool 20 by an insulating bridle the concept of which will be familiar to those of skill in the resistivity logging art. In yet further designs, the remote electrodes may be positioned in other locations including but not limited to parts of the drillpipe that is normally present inside the borehole 27.

All such arrangements of resistivity logging tools are suitable for implementing the method of the invention. Use of such tools to carry out the method of the invention therefore is within the scope of the invention.

In many examples of performance of the inventive method, the tool 20 would be conveyed (typically, but not necessarily, by lowering) into a borehole 27 on wireline. As is well known in the oil and gas logging arts, wireline is cable of high tensile strength that is capable simultaneously of supporting the mass of the logging tool 20 suspended from its lowermost end, of providing electrical power to the logging tool 20, and of telemetering data generated by to the tool 20 to a surface or other remote location.

The wireline achieves this by including inside an armoured outer coating a plurality of data cables that are connected at one end to the output stages of amplifiers that condition the signals generated by the electrodes and at the other end to log analysing and generating equipment. The wireline is paid out from a drum as the logging tool 20 passes increasingly deeply into the borehole 27, and is wound back on to the drum in order to withdraw the tool to a surface location. Logging of the formation 26 surrounding the borehole takes place while the tool 20 is being withdrawn from the borehole 27 in this way.

An alternative type of logging tool is one that carries an on-board power source usually in the form of batteries together with a memory that records the data derived from electrodes 22 and 25. Such a tool may be conveyed along the borehole 27 in either direction as desired, by directly mechanically connecting it to the drill-pipe. The tool, therefore, may be conveyed to the deepest part of the borehole (referred to as the "total depth" of the borehole 27) and then withdrawn. During such withdrawal, logging of formation data takes place.

Once the borehole has been logged, the tool 20 is retrieved to a surface location. Thereafter, the memory is accessed and the data therein downloaded and processed in order to create data logs.

The simplified tool 20 shown in FIGS. 1a-1b includes in effect only two measurement systems, respectively the shallow and deep electrode arrangements illustrated and/or described. In a practical tool, however, more than two measurements are often made; and it is common to encounter array resistivity logging tools that make five or more measurements.

The method of the invention as stated is equally applicable whether the tool is connected to wireline or is an autonomous tool of the kind just described. The method also is applicable in use of certain other tool designs; and in any event is applicable to a wide range of multiple-electrode (array) tool designs.

Regardless of the exact design of the tool 20, in broad terms (as illustrated in FIGS. 1a and 1b by the field lines 24, 29 and the shaded zones 30), current emitted from the tool 20 passes through the formation 26 surrounding a borehole 27 along which the tool 20 moves while logging takes place.

The emitted current traverses the formation following the field line paths represented in FIGS. 1a and 1b, depending on whether the tool is operating in a deep mode or a shallow mode. In FIGS. 1a and 1b arrowheads indicate the directions of current flow in a schematic fashion.

As is clearly apparent, the current returning to the guard (shallow receiver) electrodes 23 during shallow mode operation penetrates the formation to a lesser depth than the current returning to the (remote) deep current return electrode during deep mode operation.

These shallow and deep mode receiver currents flowing from electrode 22 generate voltage signals that may be analysed in order to provide an indication of $R_t$ or its inverse, conductivity. As described herein, however, various problems exist when seeking to generate $R_t$ in real time.

FIGS. 1a and 1b show schematically represented by dotted lines a zone of invasion of the formation by borehole fluid 28 as described above. Invasion is very common, especially in the period shortly after a borehole has been drilled into porous rock. At such a time, the pressure of borehole fluid is usually at its highest and may be sufficient to displace the naturally occurring fluids in the formation. Subsequently, mud in the borehole can form mudcake that narrows the borehole diameter (thereby to some extent influencing the borehole resistivity) and maintains the invasion profile by closing the pores in the formation.

The invaded zone is rarely as illustrated in FIG. 1. In particular, the radial outer extent of the invasion is ill-defined; and the diameter of the invasion is not the same all around the borehole or at different depths in the borehole.

Clearly, the current returning to the (non-illustrated) deep return electrode is less influenced by invasion fluid, and therefore is likely to represent $R_t$ more closely than the current returning to the shallow return electrodes 23.

The borehole resistance contributes a greater effect to the shallow measurement than the deep one as the resistances resulting from the resistivity values of respectively the borehole, the invaded zone and the non-invaded formation are in series in the path of the emitted current.

For the foregoing reasons, it is not possible to rely on one or other of the deep and shallow measurements alone; and their outputs must be combined in order to generate accurate logs. A problem, as set out above, however is that the prior art outputs of the deep and shallow measurements cannot be processed in real time in order to generate accurate indications of $R_t$.

This is because two variables needed in the calculation of $R_t$, namely the depth of invasion $d_i$, and the invaded zone resistivity $R_{xo}$ are not known during the logging operation. It is impossible to solve the three-variable expression that results for $R_t$.

Figure 2:
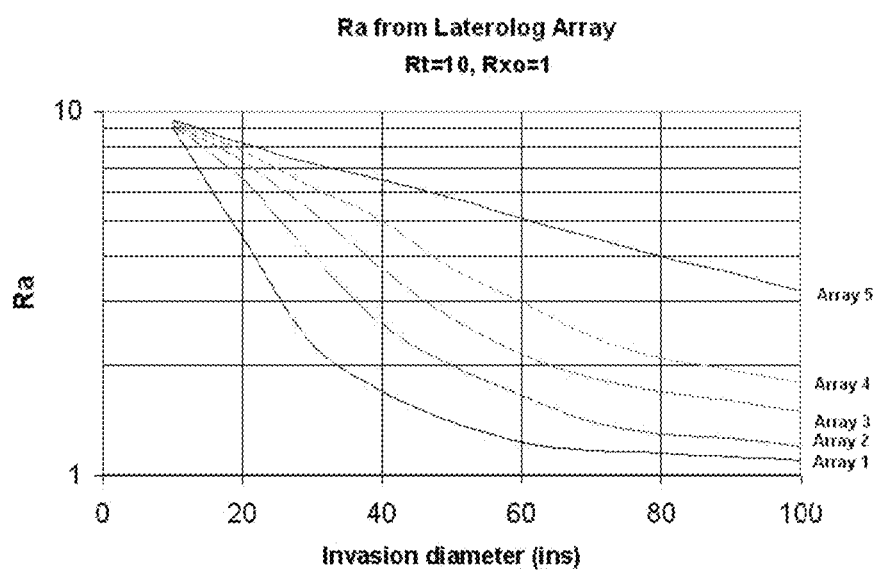
FIG. 2 shows typical values of the output from a laterolog array resistivity logging tool as invasion diameter increases, produced using conventional log generation methods.

The output values of a typical array logging tool are shown in FIG. 2.

FIG. 2 plots on a logarithmic scale the processed outputs of five receiver electrodes Array 1-Array 5 in terms of resistivity Ra measured by the tool against the assumed depth of invasion of the borehole.

The data in FIG. 2 result from computer modelling a sample formation to provide the true resistivity $R_t$ of which is known to be 10 Ω-m. The modelled invasion fluid value is selected so that the resistivity $R_{xo}$ of the invaded zone is 1 Ω-m.

As is apparent from FIG. 2, the shallowest measurement Array 1 understates the measured value of $R_t$. The curve Array 5 representing the greatest depth of investigation more closely approaches the value of $R_t$.

The FIG. 2 plot shows what happens as invasion increases. If $R_{xo}<R_t$, as di increases, the apparent resistivity naturally decreases. Array 5 is the measurement least affected by this phenomenon.

Using known "tornado chart" techniques, it is possible to calculate $R_t$ in real time, but such calculation requires knowledge of $R_{xo}$. The geometries of tools such as the autonomous types described above, and tools used in so-called "slim" wells, however make it impossible to measure $R_{xo}$ such that the tornado chart methods are not available under all circumstances. In any event, the prior art methods are usually relatively slow to carry out using available computers.

The inventors have discovered that the relationship $$R_t = 10^{\wedge}(k*\log(\text{Deep}) + (1-k)*\log(\text{Shallow}))\qquad(1)$$

may be used to determine $R_t$ without a requirement to input $R_{xo}$. In particular, if the value of k in Equation (1) can be established for the well under investigation, the calculation of $R_t$ can take place rapidly in real time.

The inventors have also established that the value of k varies with the ratio of the shallow to the deep measurement. This makes possible, by employing forward modelling, the calculation of a range of optimised values of k for a range of shallow/deep ratios. These can be calculated in advance of logging operations and stored e.g. as a database or look-up table in a memory associated with apparatus for processing the log data.

Figure 3:
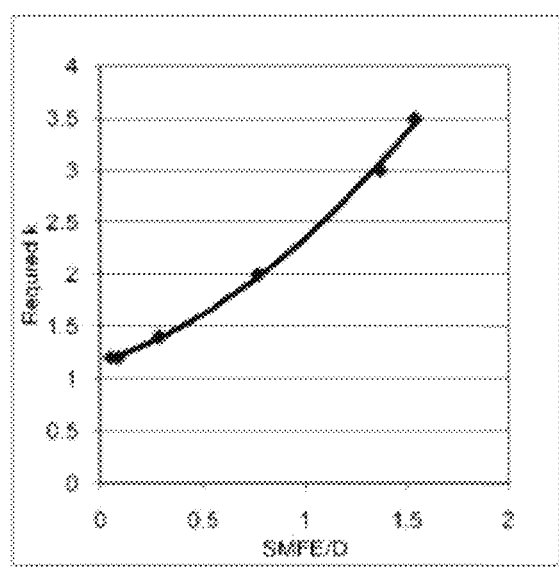
FIG. 3 is a plot of varying values of a parameter, k, used in the method of the invention against a ratio of shallow and deep log measurements as explained hereinbelow.

FIG. 3 shows a plot of the value of k (y-axis) against the ratio of the shallowest receiver output ("SMFE") to the deepest (D) in a multiple receiver-electrode logging tool. As is shown by FIG. 3, the value of k varies smoothly in dependence on this ratio. FIG. 3 therefore demonstrates that determination of k for a range of values of ratios of shallow/deep is possible. Calculation of k in a forward-modelled manner for a range of values of the shallow/deep (SMFE/D) ratio provides a range of k values that may be selected so as best to suit the formation under investigation and the characteristics of the tool in use to log it.

The expression (1) above is computationally easy to implement, meaning that the value of $R_t$ can rapidly be determined in real time without any need to input $R_{xo}$. In other words, the method of the invention processes the measured deep and shallow log data in dependence on the modelled data using an algorithm (Equation (1)) that can produce $R_t$ in real time.

Figure 4:
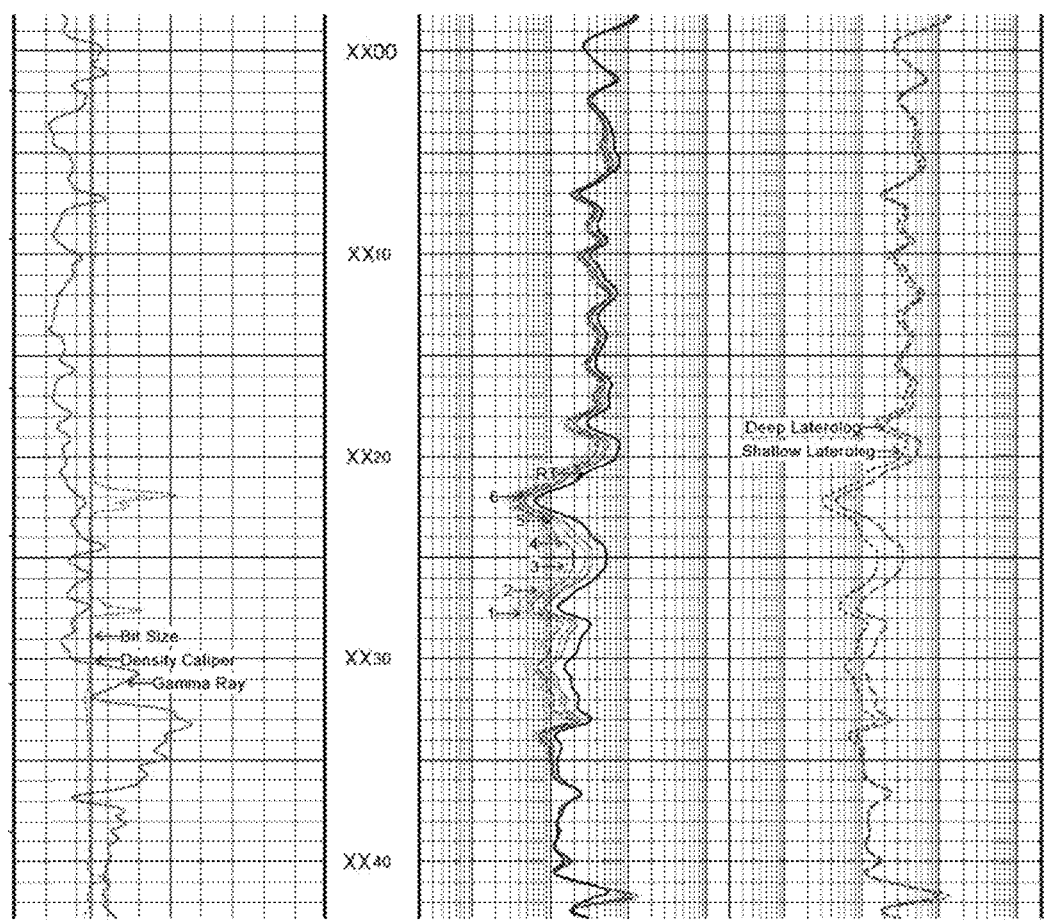
FIG. 4 is a comparison of logs produced in accordance with the method of the invention against conventional array resistivity log plots.

FIG. 4 shows in a log a comparison between the value of $R_t$ calculated in accordance with the method of the invention, and the actual value of $R_t$ in relation to experimental formation samples in which the true resistivity is known.

In FIG. 4, Track 1 as is often the case in formation logs shows physical parameters of the logging situation, including the caliper setting of a density logging tool run along the length of borehole under consideration; together with natural gamma log data.

The solid black line in Track 2 is the value of $R_t$ calculated in accordance with the method of the invention. The outputs of the array tool measurements also appear in Track 2 as comparisons.

Track 3 shows the results of deep and shallow laterolog plots of $R_t$ for the same length of borehole as is the subject of Track 2. These logs show that the value of $R_t$ calculated in accordance with the invention correlates well with other measures of the true value of resistivity of the formation.

Overall, therefore, the method of the invention offers significant improvements in the calculation of $R_t$ and, in particular, is highly suitable for determining $R_t$ in real time.

The listing or discussion of an apparently prior-published document in this specification should not necessarily be taken as an acknowledgement that the document is part of the state of the art or is common general knowledge.

What is claimed is:

1. A method of determining true formation resistivity $R_t$ of an invaded formation surrounding a borehole, the formation invaded by drilling fluid, the true formation resistivity $R_t$ representative of the resistivity of the formation undisturbed by the invasion, the method comprising:
   providing comparisons between deep and shallow log measurements forward modelled from sample data;
   operating a logging tool in the invaded formation by directly injecting electric current into the invaded formation and generating two resistivity log measurements based on return of the injected current, each resistivity log measurement having a differing depth of penetration of the invaded formation;
   combining a deeper and a shallower of the two resistivity log measurements in accordance with a non-linear combination algorithm that is modulated by a parameter by varying a value of the parameter in dependence on the provided comparisons between the deep and shallow log measurements forward modelled from the sample data; and
   generating a modified log output from the results of the combination, the modified log output indicating the true formation resistivity $R_t$ of the invaded formation relative to location in the borehole.

2. A method according to claim 1, when the method is carried out in real time on measured resistivity log data.

3. A method according to claim 1, wherein the step of combining the deeper and the shallower of the two resistivity log measurements in accordance with the non-linear combination algorithm comprises calculating the true resistivity $R_t$ in accordance with an expression $R_t = 10^{(k*\log(Deep) + (1-k)*\log(Shallow))}$,
   wherein:
   "Deep" represents output of a deeper of an array of at least two current receiver electrodes in a resistivity tool;
   "Shallow" represents output of a shallower of the array of the at least two current receiver electrodes; and
   k is the parameter and is selected for the invaded formation under investigation.

4. A method according to claim 3, wherein the parameter k represents a function of a modeled ratio of the shallow log measurement to the deep log measurement.

5. A method according to claim 1, wherein the method is carried out in real time on measured resistivity log data.

6. A method according to claim 1, wherein the modified log output is an array of resistivity curves corresponding to the differing depths of penetration of the invaded formation.

7. A method according to claim 1, wherein the step of operating the logging tool in the invaded formation to generate the two resistivity log measurements comprises the step of operating an array resistivity logging tool as the logging tool to generate the two resistivity log measurements.

8. A method according to claim 1, comprising determining the value of the parameter by modeling the deep and shallow log measurements.

9. A method according to claim 8, wherein the deep and shallow log measurements used in the modelling comprise log measurement other than the two generated resistivity log measurements.

10. A method according to claim 9, wherein determining the value of the parameter comprises the step of accessing a database of stored values of the parameter.

11. A method according to claim 8, wherein determining the value of the parameter comprises the step of accessing a database of stored values of the parameter.

12. The method of claim 1, wherein operating the logging tool to generate the two resistivity log measurements comprises operating the logging tool to generate two or more resistivity log measurements.

13. A method of determining true formation resistivity $R_t$ of an invaded formation surrounding a borehole, the formation invaded by drilling fluid, the true formation resistivity $R_t$ representative of the resistivity of the formation undisturbed by the invasion, the method comprising:
   providing comparisons between deep and shallow log measurements forward modelled from sample data;
   obtaining two resistivity log measurements, the measurements being derived by operating a logging tool in the invaded formation and directly injecting electric current into the invaded formation, wherein each of the two resistivity log measurements are based on return of the injected current and has a differing depth of penetration of the invaded formation;
   combining a deeper and a shallower of the two resistivity log measurements in accordance with a non-linear combination algorithm that is modulated by a parameter by varying a value of the parameter in dependence on the comparison between the deep and shallow log measurements forward modelled from the sample data; and
   generating a modified log output from the results of the combination, the modified log output indicating the true formation resistivity $R_t$ of the invaded formation relative to location in the borehole.

14. The method of claim 13, wherein obtaining the two resistivity log measurements comprises obtaining two or more resistivity log measurements.

* * * * *